United States Patent [19]

Martin

[11] Patent Number: 4,664,243
[45] Date of Patent: May 12, 1987

[54] CONVEYOR ROLLER AND BEARING ASSEMBLY

[75] Inventor: Donald E. Martin, Waukesha, Wis.

[73] Assignee: Rexnord Inc., Brookfield, Wis.

[21] Appl. No.: 715,541

[22] Filed: Mar. 25, 1985

[51] Int. Cl.$^4$ .................. B65G 39/09; H05F 1/02; F16C 33/66; F16C 37/00

[52] U.S. Cl. .................... 193/37; 361/212; 384/320; 384/905; 384/909

[58] Field of Search ............ 193/35 R, 35 C, 37; 308/DIG. 7, DIG. 8, DIG. 9; 384/206, 208, 213, 214, 320, 905, 908, 909; 198/780, 781, 952; 432/60, 148, 246; 29/116 R, 116 AD; 361/212, 214

[56] References Cited

U.S. PATENT DOCUMENTS

| | | | |
|---|---|---|---|
| 1,562,130 | 11/1925 | Stitzinger | 384/213 |
| 2,266,506 | 12/1941 | Morse | 193/37 X |
| 3,089,221 | 5/1963 | Barr | 308/DIG. 7 |
| 3,115,375 | 12/1963 | Haller | 384/206 |
| 3,367,728 | 2/1968 | Labbie | 384/208 |
| 3,539,234 | 11/1970 | Rapata | |
| 3,815,196 | 6/1974 | Gotham et al. | 29/116 R |
| 4,213,523 | 7/1980 | Frost et al. | 193/37 |
| 4,243,192 | 1/1981 | Johnson | 384/208 X |
| 4,311,226 | 1/1982 | Thompson et al. | 193/37 X |
| 4,312,444 | 1/1982 | Mushoure | 193/37 X |
| 4,523,674 | 6/1985 | Haugen et al. | 193/37 X |
| 4,547,082 | 10/1985 | Gerretz et al. | 384/320 X |
| 4,577,747 | 3/1986 | Martin | 193/37 X |

FOREIGN PATENT DOCUMENTS

| | | | |
|---|---|---|---|
| 805830 | 5/1951 | Fed. Rep. of Germany | 384/206 |
| 2124837 | 12/1972 | Fed. Rep. of Germany | 361/212 |
| 1152310 | 2/1958 | France | 384/206 |
| 1215355 | 12/1970 | United Kingdom | 384/213 |
| 1235460 | 6/1971 | United Kingdom | 384/206 |
| 1429821 | 3/1976 | United Kingdom | 361/214 |
| 1122553 | 11/1984 | U.S.S.R. | 384/904 |

OTHER PUBLICATIONS

"Delrin-The New Versatile Plastic That Replace Metal", *Automobile Engineer*, Nov. 1962, p. 32.

*Primary Examiner*—Andres Kashnikow
*Assistant Examiner*—Mary Beth O. Jones
*Attorney, Agent, or Firm*—Lawrence J. Crain

[57] ABSTRACT

A conveyor roller and bearing assembly designed to rotate around a fixed shaft in a conveyor frame is disclosed having a polymeric roller constructed and arranged to minimize the generation of production noise and static electricity, a polymeric spherical bearing capable of freely rotating within a shaft subjected to more than the normal degree of deflectional rotation while generating a minimum of friction and heat, and a spring loaded shaft designed for easy installation in a conveyor frame.

33 Claims, 4 Drawing Figures

CONVEYOR ROLLER AND BEARING ASSEMBLY

BACKGROUND OF THE INVENTION

The present invention relates to conveyor rollers rotating on fixed shafts in a frame and having internally mounted bearings at each end, and specifically relates to conveyor rollers used where dust and moisture create a corrosive environment, yet where conveyor cleanliness is of prime concern. An example of such an application is a soft-drink beverage bottling and packaging facility. Under normal operating conditions, each roller is subjected to periodically loading and resulting shaft deflection as a package travels across a conveyor. However, during periods of increased production, each roller may be subjected to almost continual load and shaft deflection.

Conventional rollers utilize journal bearings or anti-friction bearings such as ball bearings which are subject to misalignment or a loss of bearing surface contact when the roller shaft deflects under load. When bearing surface contact is decreased, more load is distributed over less bearing area, increasing friction and operating temperature. In the case of ball bearings, a deflection of the roller shaft of only $1\frac{1}{2}°$ causes the individual balls to become pinched between the inner and outer races. This additional load on the bearing causes a significant increase in friction as well as a corresponding increase in roller temperature. Conventional conveyor roller bearings deteriorate much faster during extended periods of this type of shaft deflection.

An additional drawback of conventional conveyor rollers is their tendency to build up a charge of static electricity which attracts a layer of process residue on the surface of the roller. This accumulated layer has a tendency to abrade the surface of cartons passing over the rollers, thus significantly decreasing package quality. This problem is more pronounced with steel rollers whose surface accumulates the residue and consequently often cuts the package material. Attempts to coat steel rollers with rubber or plastic have normally proved too costly. It is also fairly common for plant maintenance personnel to encounter debilitating shocks from contacting rollers which have built up a residual electric charge. Conventional rollers are also less desirable because of the potential for spontaneous explosions caused by the ignition of ambient dust by static sparks.

An additional drawback of conventional conveyor rollers is the quite objectionable excessive noise they produce during periods of peak production. Also, recently introduced legislation regulating conditions affecting worker health and safety has given the goal of eliminating both excessive noise and static electricity increased importance.

In an attempt to address some of the above-identified problems, rollers have been constructed from polymeric material. However, the mere substitution of polymers for conventional steel rollers and bearings has generated new difficulties, such as the inability of polymeric bearings to withstand heat, and a persistence of the static electricity problem in the roller area.

Thus, there is a definite need for a conveyor roller and bearing capable of quiet, static-free operation as well as being capable of withstanding shaft deflection on the order of 5° without generating excessive heat and friction. There is also a need for a conveyor roller which is easily installed into a conveyor frame.

It is therefore a major objective of the present invention to provide a conveyor roller designed to rotate on a fixed shaft and having internally mounted bearings capable of accepting the maximum of normally encountered shaft deflection without suffering a loss in bearing surface contact (i.e., load bearing capacity) and a concomitant increase in friction.

Another objective of the present invention is to provide a conveyor roller bearing designed to generate a minimum amount of excess heat and to more readily dissipate whatever amount of heat is generated.

A further objective of the present invention is to provide a conveyor roller which does not generate static electricity.

A still further objective of the present invention is to provide a conveyor roller which generates a minimum of operational noise.

Another objective of the present invention is to provide a conveyor roller which is easily installed in a conveyor frame.

SUMMARY OF THE INVENTION

The present invention discloses a conveyor roller designed to rotate on a fixed shaft by means of internally mounted polymeric spherical bearings located at each end of the roller and secured therein. The bearings are designed to tolerate a loaded shaft deflection which exceeds normally encountered parameters without an appreciable loss of bearing surface contact.

The structure geometry of the spherical bearings used in the present invention is designed to minimize friction and to rapidly dissipate any accumulated heat. The present invention further discloses a conveyor roller having anti-static and substantially silent-running properties especially at higher speeds, and which is designed to be readily mounted in a conveyor frame.

The conveyor roller of the present invention comprises an elongate roller tube open at each end and fabricated from a polymeric material having anti-static properties. Each of the two polymeric bearing assemblies designed to be mounted at the ends of the roller tube is comprised of an outer race comprised of two adjoining sections which, when joined, form an axial bore for accepting the fixed shaft and consisting of an integral face plate and an internally facing body portion. The face plate may be fitted with means for rapidly dissipating heat such as a plurality of outwardly extending fins.

The internally facing portion has a substantially spherically shaped exterior with means for securing the bearing within the roller tube. The freely rotating outer race encompasses the spherical inner race and, with it, combines to form the spherical bearing which facilitates the rotation of the roller tube about the fixed shaft.

The outer race is held in place within the roller tube by a combination of a pressure fit between the interior of the tube and a plurality of mounting means on the internally facing portion of the outer race.

The inner race portion is constructed of polymeric material having a higher thermal deflection temperature than the material used for the outer race and is comprised of a spherical bearing surface portion with a keyed axial bore designed to snugly accept the fixed shaft upon which the roller rotates.

The conveyor roller assembly of the present invention is easily installed in a conveyor frame by virtue of the spring-loaded shaft which allows the shaft to shift axially into one end of the roller and simultaneously extend outward from the other end, allowing snap-in installation of the roller by depressing one end of the shaft.

DESCRIPTION OF THE DRAWINGS

The invention and its many attendant objects and advantages will become better understood by reference to the following detailed description of the preferred embodiment when read in conjunction with the following drawings, wherein.

DESCRIPTION OF THE PREFERRED EMBODIMENT

Figure 1:
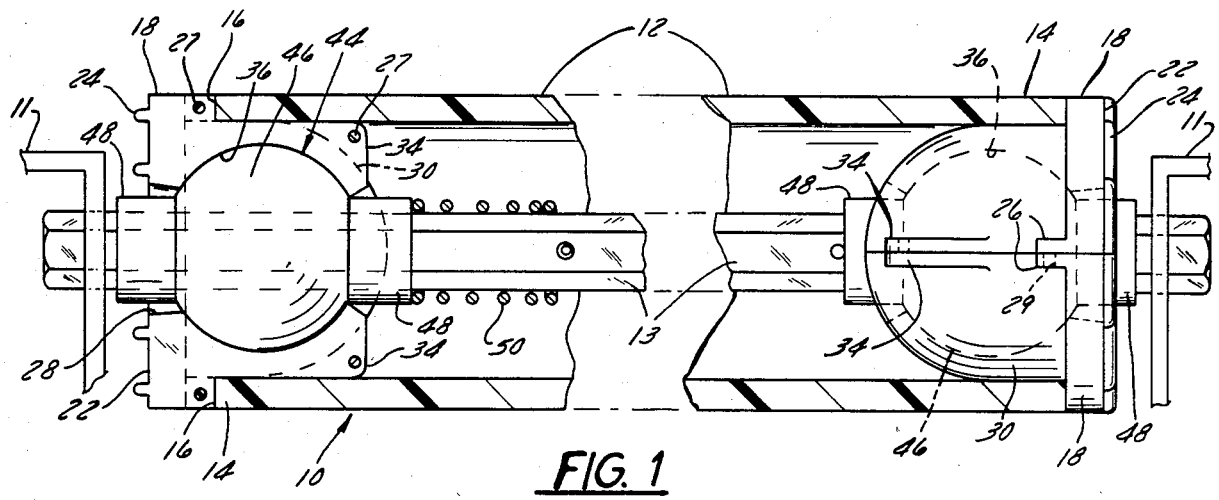
FIG. 1 is a partial section elevation of the conveyor roller of the present invention in an unloaded configuration, the left side showing the spherical bearing with one of the outer race sections removed, the right side showing the spherical bearing intact and rotated 90° to reveal the mounting lugs and notches.
Figure 2:
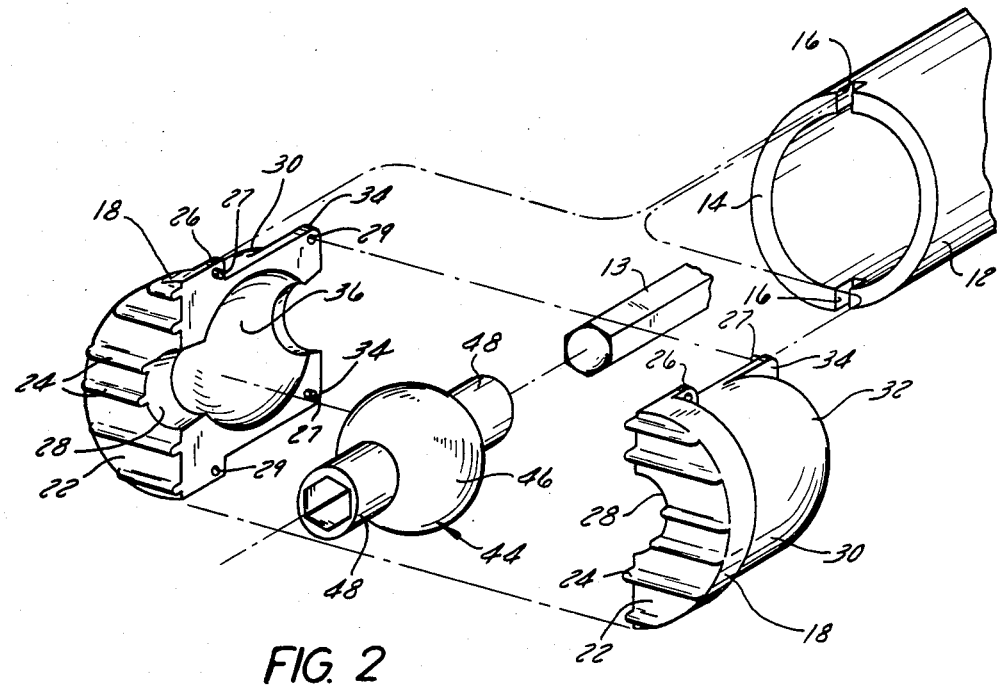
FIG. 2 is an exploded view of the spherical bearing assembly of the conveyor roller shown in FIG. 1.
Figure 3:
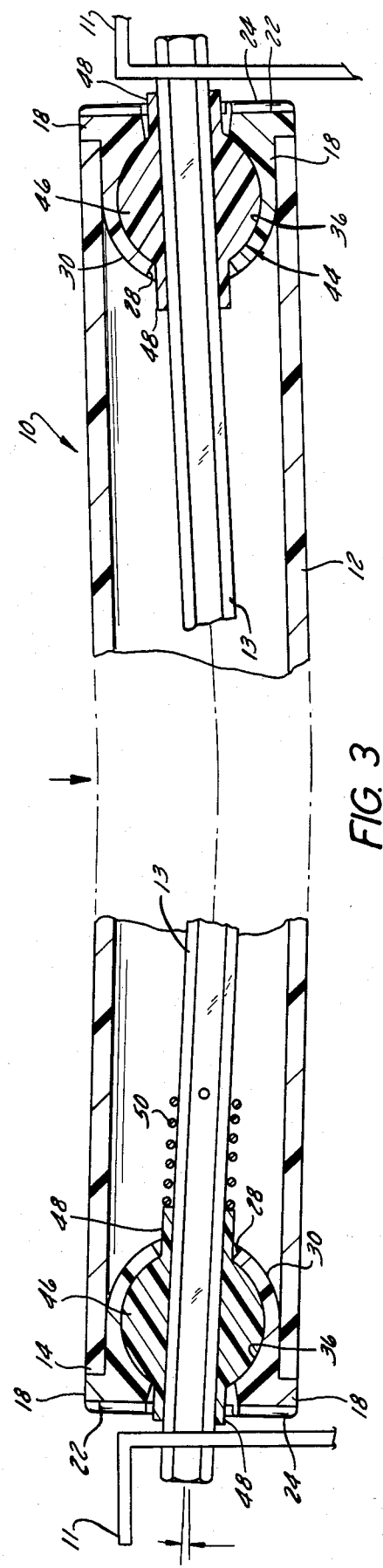
FIG. 3 is a sectional elevation of the conveyor roller of the present invention mounted in a conveyor frame in a loaded condition showing an exaggerated amount of shaft deflection.
Figure 4:
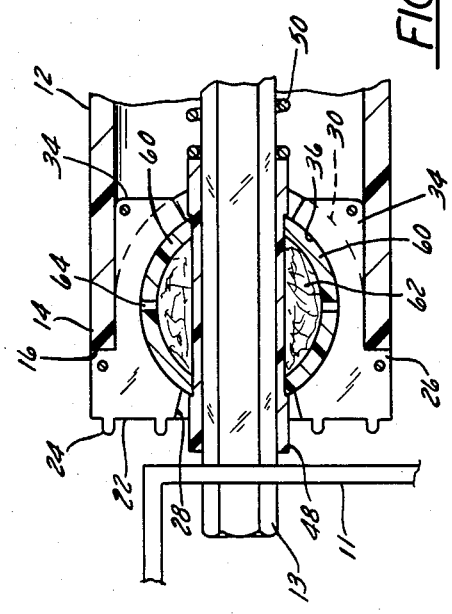
FIG. 4 is a sectional elevation of an alternate embodiment of the inner race shown in FIG. 1.

Referring now to the drawings wherein like reference characters designate identical or corresponding parts, a conveyor roller and bearing assembly 10 is shown comprising an elongate roller tube 12 constructed from a polymeric material having antistatic properties and designed to rotate around a fixed shaft 13 mounted on a conveyor frame 11. Fixed shaft 13 is normally keyed and in the preferred embodiment has a hexagonal cross section. The anti-static properies are achieved by adding a commercially available electroconductive compound into the polymeric solution. Roller tube 12 has two ends 14, each of which is fitted with at least one notch 16 to be used in securing the outer race 18 to the roller tube 12, however, other fastening means such as adhesive may be suitable.

The assembly 10 also comprises a pair of polymeric outer races 18 constructed from a material having a low thermal deflection temperatures in relation to the inner race. Thermal deflection temperature relates to the temperature at which a given plastic material begins to soften. At this temperature, which varies by the composition of the material, friction factors increase geometrically, rapidly leading to an immediate decrease in the thermal efficiency of the plastic part, in this case a bearing.

Each of said outer races is comprised of an integral face plate 22 and an inwardly facing body portion 30. The face plate 22 is fitted with a plurality of outwardly projecting cooling ribs 24 which conduct heat generated from the friction produced by the operation of the conveyor roller away from the immediate vicinity of the bearing. When the roller assembly is rotating around the fixed shaft 13, the outer race 18 rotates with the roller tube. The addition of the cooling ribs to the face plate of the outer race facilitates the conductive cooling of the bearing.

The integral face plate 22 may be secured to the interior of tube 12 by attachment means, which in the preferred embodiment consist of at least one and preferably two locking lugs 26 located on the outer periphery. These lugs 26 are designed to positively engage the notches 16 located at the ends of roller tube 12. The notches 16 and locking lugs 26 may be located in any structurally acceptable relationship to each other but are preferably positioned to be 180° apart. It has been found that if the notches of either end of the roller tube are positioned at or close to 90° out of phase with those of the other end, the bearing operates much more quietly. The face plate portion 22 may alternatively be held in the roller tube 12 by friction or an adhesive.

The integral face plates 22 have a central axial aperture 28 to accept a fixed shaft 13 and the inner bearing race 44, described below. The central aperture 28 is flared outward to compensate for movement of the inner race in response to shaft deflection under load.

Attached to the integral face plate 22 is the inwardly facing body portion 30 comprised of a tapered cylindrical shell 32 having a plurality of stabilizing lugs 34 which form a pressure fit between the outer race 18 and the interior of the roller tube 12. The body portion 30 also has a central aperture 36 to permit access by the fixed shaft 13 and the inner bearing race 44.

For easier assembly of the bearing, the outer race 18 is comprised of at least two adjoining and preferably symmetrically mating sections which are held in position by molded projections 27 located on the interior face of at least two stabilizing lugs 34. The molded projections 27 of one of the symmetrical halves positively engage receptacles 29 in the adjacent half, and various stabilizing lugs on one-half may be equipped with both projections and receptacles.

The interior of the outer race 18 of the spherical bearing is constructed and arranged to snugly encompass yet rotatably engage the inner race 44, which comprises a spherical portion 46 having a keyed axial bore and a pair of lateral keyed tubular hubs 48 adjoining said bore on either side of said spherical portion 46. The hubs 48 are designed to limit the amount of permissible shaft deflection by serving as stops against the flared axial aperture of the face plate at an angle reflecting the normal amount of deflection from the central axis. In the preferred embodiment, the desired limit of deflection was obtained with hubs 48 whose length measured approximately one-third the diameter of the spherical portion 44.

The hubs 48 also serve as spacers between the roller assembly and the frame 11, so if they are omitted, substitute spacer means should be provided.

The inner race is constructed of a polymer having a higher thermal deflection than the material used for the outer race 18. This variation in the thermal properties of the bearing components is designed to facilitate the conduction of heat away from the bearing contact area by the cooling ribs 24.

Heat buildup through friction is an inherent problem of conveyor roller bearings, but is more crucial when polymeric bearings are used, since at higher operating tempertures the polymeric bearing surfaces tend to soften, causing greater friction, more heat and eventual seizing of the bearing due to melting of the components. In the present invention, the inner race is fixed to the stationary shaft and the roller tube and outer race rotate around it. Thus, a particular portion of the inner race is continually subject to loading, increased friction and higher temperatures, while the entire race area of the rotating outer race is subjected to load. For this reason, the present invention discloses an inner race fabricated from a material having a higher thermal deflection temperature than the material used for the outer race.

In the preferred embodiment, the inner race is fabricated from nylon which has a thermal deflection temperature of 450° F. at 66 p.s.i., and the outer race is fabricated from DELRIN ® which has a thermal deflection temperature of 340° F. at 66 p.s.i. Other polymers having similar relative properties may be substituted while still comporting with the spirit of the invention.

Heat buildup is kept to a minimum in the present invention by a combination of the thermal interaction of the different inner and outer race materials which tends to draw heat from the high load area of the inner race, the large spherical bearing surface area which helps to dissipate heat over a broad area, the internal lubricity of the materials, and the cooling fins which assist in the conduction of heat from the outer race.

Although the preferred embodiment discloses an inner race having a solid one piece spherical portion, the inner race may be alternatively manufactured in two halves 60 and provided with a lubricant reservoir 62 similar to the ones disclosed by Haller in U.S. Pat. No. 3,115,375. However, care must be taken to add a lubricant access orifice 64 to enable the lubricant to be distributed in the race area. This orifice was omitted from Haller's device. The preferred materials are self-lubricating, so supplemental lubrication is not required for satisfactory operation of the present invention. However, under certain conditions, the addition of lubricant may significantly prolong the useful life of the bearing.

If such an embodiment is selected, it is advisable for noise reduction purposes to split the inner race along an axis at right angles to the plane containing the seam of the two halves of the outer race 18.

The bearing assembly of the present invention is assembled by placing the inner race 44 into one of the outer race halves. The other outer race half is positively engaged with the first half by means of the molded projections 28 and sealed by mechanical means such as sonic welding or chemical means such as adhesive. The outer races 18 are then inserted into the tube 12 so that the locking lugs 26 engage notches 16. The outer races can be secured in the tube by chemical adhesives.

To facilitate installation of the present conveyor roller assembly into a coneyor frame 11, the shaft is spring loaded in the roller in the following manner. Prior to the insertion of the outer races 18, coiled spring 50 is fixed to the shaft directly adjacent to the innermost margin of one of the end caps 18. The placement of the spring in this location renders the shaft resiliently and slidably retractable in the roller tube. When installation of the present roller is desired one merely snaps it into the conveyor frame by means of the retractable shaft.

Thus, the present invention provides a conveyor roller and bearing assembly which is designed for low friction operation, can accommodate more than the normal degree of loaded shaft deflection, rapidly dissipates any generated heat, generates a minimum of static electricity in the roller area under load, and operates with a minimal amount of noise.

While a particular embodiment of this roller and bearing assemby has been shown and described, it will be obvious to persons skilled in the art that changes and modifications might be made without departing from the invention in its broader aspects. It is the aim of the dependent claims to cover all such changes and modifications as fall within the true scope and spirit of the invention.

What is claimed is:

1. A conveyor roller assembly comprising:
   a shaft having a non-circular cross section, a longitudinal axis and designed to be mounted in a conveyor frame;
   a cylindrical roller tube open at both ends and designed to spin coaxially about said shaft; and
   a polymeric spherical bearing assembly disposed at each end of said tube to facilitate the free rolling action of said roller tube about said shaft, said bearing assembly comprising:
   an outer member comprised of adjoining sections and consisting of a body portion, the outer surface of which is designed to fit into the interior of the end of said tube, and an integral face plate fitting substantially flush with the end of said tube, said body portion having a hollow interior forming a spherical outer bearing race, and axially aligned openings through said face plate and the opposite end of said outer member, said openings communicating with said spherical race;
   an inner member comprising a spherical body and a bore extending axially through said body, said bore being of a noncircular shape similar to the cross section of said shaft, said spherical outer race being journaled for free rotation about said spherical body of said inner member to allow the inner member to pivot in any plane passing through the axis of said shaft with respect to the outer member, to accommodate deflection of said shaft while simultaneously maintaining said inner member in substantial bearing contact with the outer member and in so doing, to facilitate the free rolling action of said roller tube about said shaft; and
   wherein the polymerical material used to fabricate said outer member has a relatively low thermal deflection temperature compared to the material of said inner member.

2. The conveyor roller assembly defined in claim 1 wherein said cylindrical roller tube is constructed of polymeric, anti-static material.

3. The conveyor roller assembly defined in claim 1 wherein said adjoining sections of said outer member consist of two symmetrically mating halves.

4. The conveyor roller assembly defined in claim 1 wherein said integral face plate of said outer member is fitted with a plurality of outwardly extending cooling fins.

5. The conveyor assembly defined in claim 1 wherein said axially aligned opening in said face plate is outwardly flared.

6. The conveyor roller assembly defined in claim 1 wherein said body portion is designed to be contained in said tube via friction means, said friction means comprised of a plurality of mounting fins projecting from the outer surface of said outer member.

7. The conveyor roller assembly defined in claim 1 wherein said outer member is prevented from rotating within said cylindrical tube by noise reducing fixing means; wherein said noise reducing fixing means located at one end of said tube is offset from the fixing means at the opposite end of said tube.

8. The conveyor roller assembly defined in claim 7 wherin said noise-reducing fixing means is comprised of at least one notch in each end of said cylindrical tube which is designed to mate with a corresponding lug in said outer member; said notches positioned to reduce the operational noise level of said assembly.

9. The conveyor roller assembly defined in claim 8 wherein said noise-reducing fixing means is comprised of two notches in each end of said tube and corresponding lugs in said outer member located approximately 180° apart from each other, and the notches of one end of said tube are oriented to be of the order of 90° out of phase with respect to the notches of the other end of said tube.

10. The conveyor roller assembly defined in claim 1 wherein said inner member is fitted with a pair of diametrically opposed hub extensions, each of said extensions having an axial bore designed to be similar to the cross section of said fixed shaft and wherein the clearance between said hub extensions and said openings in said integral face plate is sufficient to allow the inner member to accommodate said deflection of said conveyor shaft with respect to said outer member in any plane passing through the axis of said roller shaft.

11. The conveyor roller assembly defined in claim 10 wherein said spherical bearing is capable of accommodating on the order of 5° of shaft deflection while maintaining substantial rolling bearing surface contact.

12. A conveyor roller and bearing assembly designed to rotate around a fixed shaft while generating a minimum amount of static electricity comprising:
   a fixed rigid shaft having a non-circular cross section, a longitudinal axis, and designed to be mounted on a conveyor frame;
   a cylindrical roller tube of polymeric material having anti-static properties, being open at both ends and designed to spin coaxially about said shaft; and
   a polymeric spherical bearing assembly disposed at each end of said tube to facilitate the free rolling action of said roller tube about said shaft, said bearing assembly comprising:
   an outer member consisting of a body portion, the outer surface of which is designed to fit into and engage the interior of the end of said roller tube, and an integral face plate fitting substantially flush with the end of said tube and having a plurality of outwardly extending cooling fins, said body portion having a hollow interior forming a spherical outer bearing race and an axially aligned flared opening through said face plate and an axially aligned opening through the opposite end of said outer member, said openings communicating with said outer bearing race; and
   an inner member comprising a spherical body fabricated from a material having a higher thermal deflection temperature than the thermal deflection temperature of said outer member and having a bore extending axially through said body, said bore being of a non-circular shape similar to the cross section of said fixed shaft; and
   a pair of diametrically opposed hub extensions, each having an axial bore mating with the cross section of said fixed shaft, wherein said spherical outer race is journalled for free rolling rotation about said spherical body of said inner member so that said inner member may pivot an amount limited by the contact of said hub extensions against said flared opening of said face plate in any plane passing through the axis of said roller shaft with respect to the outer member to accommodate deflection of said conveyor shaft while simultaneously maintaining said inner member in substantial rolling and load bearing contact with said outer bearing race.

13. The conveyor roller assembly defined in claim 12 wherein the outwardly extending cooling fins are oriented to be parallel with the axis of said shaft and normal to the direction of rotation of said roller.

14. A conveyor roller assembly comprising:
   a shaft having a non-circular cross section, a longitudinal axis and designed to be mounted in a conveyor frame;
   a cylindrical roller tube at both ends and designed to spin coaxially about said shaft; and
   a polymeric spherical bearing assembly disposed at each end of said tube to facilitate the free rolling action of said roller tube about said shaft, said bearing assembly comprising:
   an outer member comprised of adjoining sections and consisting of a body portion, the outer surface of which is designed to fit into the interior of the end of said tube, and an integral face plate fitting substantially flush with the end of said tube, said body portion having a hollow interior forming a spherical outer bearing race and axially aligned openings through said face plate and the opposite end of said outer member, said openings communicating with said spherical race;
   an inner member comprising a spherical body and a bore extending axially through said body, said bore being of a noncircular shape similar to the cross section of said shaft, said spherical outer race being journaled for free rotation about said spherical body of said inner member to allow the inner member to pivot in any plane passing through the axis of said shaft with respect to the outer member, to accommodate deflection of said shaft while simultaneously maintaining said inner member in substantial bearing contact with said outer member and in so doing, to facilitate the free rolling action of said roller tube about said shaft; and
   wherein said outer member is prevented from rotating within said cylindrical tube by noise-reducing fixing means comprised of two notches in each end of said cylindrical tube which are designed to mate with corresponding lugs in said outer member located approximately 180° apart from each other, and the notches of one end of said tube are oriented to be on the order of 90° out of phase with respect to the notches of the other end of said tube to reduce the operational noise level of said assembly.

15. The conveyor roller assembly defined in claim 14 wherein said cylindrical tube is constructed of polymeric, antistatic material.

16. The conveyor roller assembly defined in claim 14 wherein said polymeric material used to fabricate said outer member has a relatively low thermal deflection temperature compared to the material of said inner member.

17. The conveyor roller assembly defined in claim 14 wherein said adjoining sections of said outer member consist of two symmetrically mating halves.

18. The conveyor roller assembly defined in claim 14 wherein said integral face plate of said outer member is fitted with a plurality of outwardly extending cooling fins.

19. The conveyor roller assembly defined in claim 14 wherein said axially aligned openings in said face plate are outwardly flared.

20. The conveyor roller assembly defined in claim 14 wherein said body portion is designed to be contained in said tube via friction means, said friction means comprised of a plurality of mounting fins projecting from the outer surface of said outer member.

21. The conveyor roller assembly defined in claim 14 wherein said inner member is fitted with a pair of diametrically opposed hub extensions, each of said extensions having an axial bore designed to be similar to the cross section of said fixed shaft and wherein the clearance between the said hub extensions and said openings in said integral face plate is sufficient to allow the inner member to accommodate said deflection of said conveyor shaft with respect to said outer member in any plane passing through the axis of said roller shaft.

22. The conveyor roller assembly defined in claim 14 wherein said spherical bearing is capable of accommodating on the order of 5° of shaft deflection while maintaining substantial rolling bearing surface contact.

23. A conveyor roller and bearing assembly comprising:
- a shaft having a non-circular cross section, a longitudinal axis and designed to be mounted in a conveyor frame;
- a cylindrical polymerical roller tube open at both ends and designed to spin coaxially about said shaft; and
- a three piece polymeric spherical bearing assembly disposed at each end of said tube to facilitate the free rolling action of said roller tube about said shaft, said bearing assembly comprising:
- an outer member comprised of adjoining sections and consisting of a body portion, the outer surface of which is designed to be secured by friction means into the interior of the end of said tube, and an integral face plate fitting substantially flush with the end of said tube, said body portion having a hollow interior forming a spherical outer bearing race, and axially aligned openings through said face plate and the opposite end of said outer member, said openings communicating with the said spherical race;
- an inner member comprising a spherical body and a bore extending axially through said body, said bore being of a noncircular shape similar to the cross section of said shaft, said spherical outer race being journaled for free rotation about said spherical body of said inner member to allow the inner member to pivot in any plane passing through the axis of said shaft with respect to the outer member, to accommodate deflection of said shaft while simultaneously maintaining said inner member in substantial bearing contact with said outer member and in so doing, to facilitate the free rolling action of said roller tube about said shaft; and
- said outer member is prevented from rotating within said cylindrical tube by noise reducing fixing means wherein said fixing means is comprised of two notches in each end of said cylindrical tube which are designed to mate with corresponding lugs in said outer member located approximately 180° apart from each other, and said notches of one end of said tube are oriented to be on the order of 90° out of phase with respect to the notches of the other end of said tube to reduce the operational noise level of said assembly.

24. The conveyor roller assembly defined in claim 23 wherein said cylindrical roller tube is constructed of a polymeric material to which a separate, electro-conductive compound has been added to provide anti-static properties.

25. The conveyor roller assembly defined in claim 23 wherein said integral face plate of said outer member is fitted with a plurality of cooling fins extending outwardly from said face plate in parallel orientation to the axis of said shaft and normal to the direction of rotation of said roller.

26. The conveyor roller assembly defined in claim 23 wherein said adjoining sections of said outer member comprise two symmetrically mating halves.

27. A conveyor roller and bearing assembly comprising:
- a shaft having a non-circular cross section, a longitudinal axis and designed to be mounted in a conveyor frame;
- a cylindrical polymeric roller tube open at both ends and designed to spin coaxially about said shaft; and
- a three piece polymeric spherical bearing assembly disposed at each end of said tube to facilitate the free rolling action of said roller tube about said shaft, and bearing assembly comprising:
- an outer member comprised of adjoining sections and consisting of a body portion, the outer surface of which is designed to be secured by friction means into the interior of the end of said tube, and an integral face plate fitting substantially flush with the end of said tube, said body portion having a hollow interior forming a spherical outer bearing race, and axially aligned openings through said face plate and the opposite end of said outer member, said openings communicating with said spherical race, said face plate being fitted with a plurality of cooling fins extending outwardly therefrom in parallel relationship to the axis of said rigid shaft and normal to the direction of rotation of said roller;
- an inner member comprising a spherical body and a bore extending axially through said body, said bore being of a noncircular shape similar to the cross section of said shaft, said spherical outer race being journaled for free rotation about said spherical body of said inner member to allow the inner member to pivot in any plane passing through the axis of said shaft with respect to the outer member, to accommodate deflection of said shaft while simultaneously maintaining said inner member in substantial bearing contact with said outer member and in so doing, to facilitate the free rolling action of said roller tube about said shaft; and
- said outer member is prevented from rotating within said cylindrical tube by noise reducing fixing means, said fixing means is comprised of two notches in each end of said cylindrical tube which are designed to mate with corresponding lugs in said outer member located approximately 180° apart from each other, and the notches of one end of said tube are oriented to be on the order of 90° out of phase with respect to the notches of the other end of said tube to reduce the operational noise level of said assembly.

28. The conveyor roller assembly defined in claim 27 wherein said adjoining sections of said outer member comprise two symmetrically mating halves.

29. A conveyor roller and bearing assembly comprising:
- a shaft having a non-circular cross section, a longitudinal axis and designed to be mounted in a conveyor frame;
- a cylindrical roller tube constructed of polymeric material to which a separate, electro-conductive compound has been added to provide anti-static properties, said tube open at both ends and designed to spin coaxially about said shaft; and a three piece polymeric spherical bearing assembly disposed at each end of said tube to faciliate the free rolling action of said roller tube about said shaft, said bearing assembly comprising:

an outer member comprised of adjoining sections and consisting of a body portion, the outer surface of which is designed to be secured by friction means into the interior of the end of said tube, and an integral face plate fitting substantially flush with the end of said tube, said body portion having a hollow interior forming a spherical outer bearing race, and axially aligned openings through said face plate and the opposite end of said outer member, said openings communicating with said spherical race;

an inner member comprising a spherical body and a bore extending axially through said body, said bore being of a noncircular shape similar to the cross section of said shaft, said spherical outer race being journaled for free rotation about said spherical body of said inner member to allow the inner member to pivot in any plane pressing through the axis of said shaft with respect to the outer member, to accommodate deflection of said shaft while simultaneously maintaining said inner member in substantial bearing contact with said outer member and in so doing, to facilitate the free rolling action of said roller tube about said shaft; and said outer member is prevented from rotating within said cylindrical tube by noise reducing fixing means wherein said noise reducing fixing means is comprised of two notches in each end of said cylindrical tube which are designed to mate with corresponding lugs in said outer member located approximately 180° apart from each other, and the notches of one end of said tube are oriented to be on the order of 90° out of phase with respect to the notches of the other end of said tube to reduce the operational noise level of said assembly.

30. The conveyor roller assembly defined in claim 29 wherein said integral face plate of said outer member is fitted with a plurality of cooling fins extending outwardly therefrom in parallel relationship with the axis of said rigid shaft and normal to the direction of rotation of said roller.

31. The conveyor roller assembly defined in claim 29 wherein said adjoining sections of said outer member comprise two symmetrically mating halves.

32. A conveyor roller and bearing assembly comprising:

a shaft having a non-circular cross section, a longitudinal axis and designed to be mounted in a conveyor frame;

a cylindrical roller tube constructed of polymeric material to which a separate, electro-conductive compound has been added to provide anti-static properties, said tube open at both ends and designed to spin coaxially about said shaft; and a three piece polymeric spherical bearing assembly disposed at each end of said tube to facilitate the free rolling action of said roller tube about said shaft, said bearing assembly comprising:

an outer member comprised of adjoining sections and consisting of a body portion, the outer surface of which is designed to be secured by friction means into the interior of the end of said tube, and an integral face plate fitting substantially flush with the end of said tube, said body portion having a hollow interior forming a spherical outer bearing race, and axially aligned openings through said face plate and the opposite end of said outer member, said openings communicating with said spherical race, said face plate provided with a plurality of cooling fins extending outwardly therefrom and in parallel relationship with the axis of said rigid shaft;

an inner member comprising a spherical body and a bore extending axially through said body, said bore being of a non-circular shape similar to the cross section of said shaft, said spherical outer race being journaled for free rotation about said spherical body of said inner member to allow the inner member to pivot in any plane passing through the axis of said shaft with respect to the outer member, to accommodate deflection of said shaft while simultaneously maintaining said inner member in substantial bearing contact with said outer member and in so doing, to facilitate the free rolling action of said roller tube about said shaft; and said outer member is prevented from rotating within said cylindrical tube by noise reducing fixing means, wherein said noise reducing fixing means is comprised of two notches in each end of said cylindrical tube which are designed to mate with corresponding lugs in said outer member located approximately 180° apart from each other, and the notches of one end of said tube are oriented to be on the order of 90° out of phase with respect to the notches of the other end of said tube to reduce the operational noise level of said assembly.

33. The conveyor roller assembly defined in claim 32 wherein said adjoining sections of said outer member comprise two symmetrically mating halves.

* * * * *